United States Patent
Xie et al.

(10) Patent No.: US 6,946,214 B2
(45) Date of Patent: Sep. 20, 2005

(54) MANUFACTURING METHOD OF FUEL CELL ELECTRODE AND FUEL CELL USING THEREOF

(75) Inventors: Gang Xie, Aichi-ken (JP); Harumi Hashiguchi, Aichi-ken (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 318 days.

(21) Appl. No.: 10/145,107

(22) Filed: May 15, 2002

(65) Prior Publication Data

US 2002/0197524 A1 Dec. 26, 2002

(30) Foreign Application Priority Data

May 15, 2001 (JP) .................................... 2001-145552

(51) Int. Cl.[7] .................... H01M 4/86; H01M 4/90; H01M 4/96
(52) U.S. Cl. ..................... 429/42; 429/44; 427/115
(58) Field of Search ............... 429/42; 427/115; 252/182.1

(56) References Cited

U.S. PATENT DOCUMENTS

| | | | | |
|---|---|---|---|---|
| 5,460,896 A | * | 10/1995 | Takada et al. | 429/33 |
| 5,521,020 A | * | 5/1996 | Dhar | 429/42 |
| 5,558,955 A | * | 9/1996 | Breault et al. | 429/38 |
| 5,935,643 A | * | 8/1999 | Song et al. | 427/115 |
| 6,451,470 B1 | | 9/2002 | Koschany et al. | |

FOREIGN PATENT DOCUMENTS

| | | |
|---|---|---|
| DE | 197 09 199 | 9/1998 |
| JP | 8-185867 | 7/1996 |
| JP | 11-339815 | 12/1999 |

* cited by examiner

Primary Examiner—Patrick Joseph Ryan
Assistant Examiner—Julian Mercado
(74) Attorney, Agent, or Firm—Oblon, Spivak, McClelland, Maier & Neustadt, P.C.

(57) ABSTRACT

The fuel cell with excellent power generation performance and high reliability and a manufacturing method of a fuel cell electrode by which the flooding phenomenon is hard to be caused at a contact portion with a separator because of small contact resistance with the separator. According to the manufacturing method of the fuel cell electrode, a first application process for applying an electrically conductive water repellent material including electrically conductive particles and water repellent particles on one side of a gas diffusion substrate having the gas permeability, a first sintering process for sintering the applied electrically conductive water repellent material, and a catalyst support process for supporting a catalyst on the other side of the gas diffusion substrate are provided. The fuel cell manufacture in the foregoing manner is provided with a joint body of an electrolyte, an oxidant electrode, and a fuel electrode in which the electrolyte is sandwiched by the oxidant electrode and the fuel electrode. At least the oxidant electrode out of the oxidant electrode and the fuel electrode is the fuel cell electrode.

12 Claims, 7 Drawing Sheets

MANUFACTURING METHOD OF FUEL CELL ELECTRODE AND FUEL CELL USING THEREOF

This application is based on and claims priority under 35 U.S.C. § 119 with respect to Japanese Application No. 2001-145552 filed on May 15, 2001, the entire content of which is incorporated herein by reference.

FIELD OF THE INVENTION

This invention generally relates to a fuel cell. More particularly, the present invention pertains to a fuel cell electrode and a manufacturing method for the fuel cell electrode.

BACKGROUND OF THE INVENTION

Although electric vehicles are used as a counter measurement of the automobile exhaust for reducing the air contamination, the electric vehicles have not been prevailed because of the drawbacks such as lack of battery charging facilities and insufficient mileage per charge. Thus, a vehicle applied with a fuel cell is considered to be the most environmentally benign automobile of great promise. Among the fuel cells, a solid polymer electrolyte fuel cell is the most capable fuel cell for the automobile because the fuel cell is operated under the low temperature.

Generally, plural single cells are stacked to form a fuel cell. The single cell includes an electrolyte sandwiched by two electrodes (i.e., a fuel electrode and an oxidant electrode) and separators which sandwich the electrodes. A fuel gas and an oxidant gas are supplied to the fuel electrode and the oxidant electrode respectively via gas passages provided on respective separators for generating the electric power by the electrochemical reaction. Thus, the fuel cell is recognized as an environmentally benign power generation device without exhaust except the water.

The solid polymer electrolyte fuel cell includes a polymer ion exchange membrane (i.e., solid polymer electrolyte membrane) as an electrolyte. The fuel gas including the humidified hydrogen or the hydrogen reaches a catalyst layer via a gas diffusion layer of the fuel electrode which also serves as a current collector to cause the following reaction.

A proton $H^+$ generated at the fuel electrode moves towards the oxidant electrode via the electrolyte accompanied with the water molecule. Simultaneously, the electron $e^-$ generated at the fuel electrode is moved towards the oxidant electrode through the gas diffusion layer and the catalyst layer (i.e., current collector) and through a resistance connected between the fuel electrode and the oxidant electrode via an external circuit.

On the other hand, at the oxidant electrode, the oxidant gas including the humidified oxygen reaches the catalyst layer through the gas diffusion layer of the oxidant electrode which is also the current collector. The oxygen receives the electron flowed from the external circuit via the gas diffusion layer (i.e., current collector) and via the catalyst layer to be deoxidized following the following reaction. Then oxygen is bonded to the proton $H^+$ moved from the fuel electrode via the electrolyte membrane to become the water.

A part of the generated water is entered into the electrolyte membrane due to the higher concentration gradient of the electrolyte membrane, and is diffused to be moved towards the fuel electrode. A part of the generated water is evaporated to be diffused to the gas passage via the catalyst layer and the gas diffusion layer to be exhausted along with the non-reacting oxidant gas. Thus, when the gas diffusion layer of the fuel electrode and the oxidant electrode do not have sufficient water repellency, the water vapor is apt to be condensed to become the water, which may be the obstruction for the transportation of the reactant and the product.

Gas diffusion layers of the fuel electrode side and the oxidant electrode side construct an electric circuit by contacting convex portions of the respective separators. Thus, it is required to reduce the contact resistance between the gas diffusion layers and the separator to the minimum. Further, because the separator is generally made of metal or carbon which do not have high water repellency, the water is condensed at the contact portion to cause the flooding phenomenon to deteriorate the power generation performance unless the water repellency of the contact portion between the gas diffusion layer and the separator is high.

A known fuel cell electrode and the manufacturing method thereof is disclosed in Japanese Patent Laid-Open Publication No. H08-185867. In this known fuel cell electrode, a highly porous carbon paper with electric conduction is impregnated with the tetrafluoroethylene (i.e., hereinafter referred as PTFE) dispersion and is sintered to become a substrate having water repellency. A catalyst layer is formed on one side of the substrate.

Notwithstanding, in the known fuel cell electrode and the manufacturing method thereof disclosed in Japanese Patent Laid-Open publication No. H08-185867, because the gas diffusion layer includes the structure in which the water repellent and the insulating PTFE particles are dispersedly attached to the substrate serving as the current collector, the contact resistance between the gas diffusion layer and the separator is large. In addition, because the water repellency of the contact portion between the gas diffusion layer and the separator is insufficient, the power generation performance is insufficient and the condensation of the water at the contact portion cannot be eradicated.

A need thus exists for a manufacturing method of a fuel cell electrode which includes small contact resistance with a separator and which is hard to cause the flooding phenomenon at a contact portion with the separator, and for a fuel cell with high power generation performance and high reliability.

SUMMARY OF THE INVENTION

In light of the foregoing, the present invention provides a manufacturing method of a fuel cell electrode comprise the steps, which are a first application process for applying an electric water repellent material including electrically conductive particles and water repellent particles on one side of a gas diffusion substrate having gas permeability, a first sintering process for sintering the applied electrically conductive water repellent material, and a catalyst support process for supporting a catalyst on the other side of the gas diffusion substrate.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

DETAILED DESCRIPTION OF THE INVENTION

Applicants of the present invention have studied a cause that increases the contact resistance between an electrode and a separator and a cause that is apt to cause the condensation of the water vapor to the water at a contact portion between the electrode and the separator.

Figure 7:
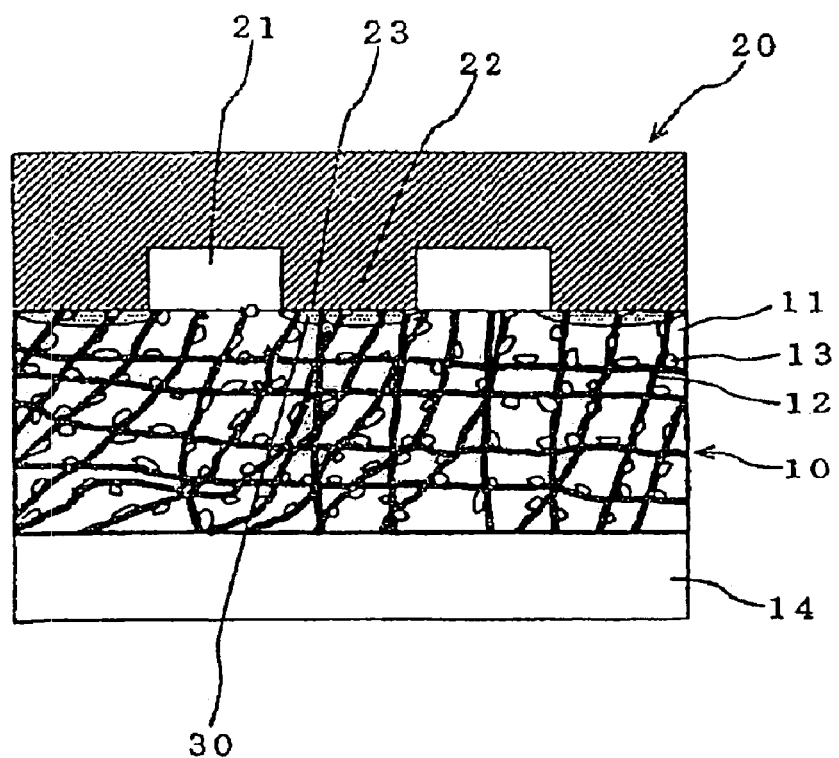
FIG. 7 is a magnified partial cross-sectional view showing a contact portion between an oxidant electrode and a separator of a known device.

FIG. 7 is a magnified partial cross-sectional view showing a contact portion between an oxidant electrode and a separator of a known device. As shown in FIG. 7, an oxidant electrode 10 and a separator 20 contact each other. One side surface of the oxidant electrode 10 with a carbon paper 11 which has the water repellent treatment contacts the separator. A catalyst layer 14 is provided on the other side surface of the oxidant electrode 10. The carbon paper 11 is made from the aggregation of carbon fiber 12. The carbon paper 11 is proceeded with the water repellent treatment by impregnating with the PTFE dispersion and by sintering the PTFE. After proceeding the water repellent treatment, PTFE particles 112 are attached on the carbon fiber 12. The separator 20 is provided with gas passages 21 for supplying the oxidant gas to the oxidant electrode 10. Portions of the separator 20 which are not the gas passages 21 are constructed as contact portions 22 to contact the oxidant electrode 10.

When a fuel cell starts power generation, the water is generated in the catalyst layer 14 according to the formula (2). The generated water is moved to the separator 20 sides to become the vapor along with the water being moved through an electrolyte accompanied with the proton. Most of the water vapor is exhausted to the outside with non-reacting oxidant gas which was not used for the electrode reaction via the gas passages 21.

Notwithstanding, a part of the water vapor reached to a contact surface between the oxidant electrode 10 and the contact portion 22 is condensed to become the water before moving towards the gas passages 21. The condensed water is once remained on the portion of the contact surface 23 and then, induces the condensation of the newly reached water vapor. Thus, the volume of the condensed water is increased to cause the flooding to decline the power generation performance. The applicants of the present invention considered that the condensed water is apt to be remained on the portion of the contact surface 23 because the separator 20 is hydrophilic On the other hand, the applicants of the present invention concluded that the contact resistance is increased because the electric contact dimension between the separator 20 and the oxidant electrode 10 at the contact surface 23 is reduced because the electrically insulated PTFE particles are attached on the surface of the carbon fiber 12 by proceeding the water repellent treatment.

In order to solve the problem of the condensed water, it is considered to treat the water repellency on the surface of the separator 20 or to increase the water repellency of the oxidant electrode 10. However, this causes another drawback to increase the contact resistance because the water-repellent is electrically insulated.

The applicants of the present invention found a solution to obviate the foregoing drawbacks by providing a layer including the gas permeability, the water repellency, and the electric conductivity between the oxidant electrode 10 and the separator 20. That is, by applying the electrically conductive water repellent material including electrically conductive particles and water repellent particles on the side of the electrode facing the separator, the layer including the gas permeability, the water repellency, and the electric conductivity appropriate for the fuel cell can be formed.

Embodiments of the present invention will be explained as follows.

According to a first embodiment, a carbon cloth (Nippon Carbon Co. Ltd.: GF-20-P7) is used as a gas diffusion substrate. The dispersion liquid concentrate (DAIKIN INDUSTRIES Ltd.: POLYFLON; D1 grade) containing 60 wt % concentration of PTFE particles (i.e., water repellent particles) is diluted with water to make the PTFE particle dispersion liquid containing 15 wt % of the concentration of the PTFE particles. The carbon cloth is impregnated with the PTFE particle dispersion liquid. After evaporating the excessive water by a furnace in which the temperature is kept at 80° C. Then, the PTFE is sintered being kept under the temperature at 390° C. for 60 minutes.

A carbon black (Cabot Specialty Chemicals Inc. Japan: Vulcan XC-72R; average particle diameter 40 nm) is used as an electrically conductive particles. PTFE particle is used as water repellent particle. In practice, the POLYFLON dispersion liquid concentrate is used as PTFE particle.

Carbon black paste is made by blending and mixing the carbon black, the dispersion liquid concentrate, and ethylene glycol (i.e., forming agent) by weight ratio of 1:1.25:10. The carbon black paste is applied to one side of the water repellent treated carbon cloth by the screen print method (i.e., a first application process). After evaporating the excessive water of the carbon cloth in the furnace in which the temperature is kept at 80° C., PTFE is sintered at the sinter temperature 390° C. for 60 minutes to form a first water repellent carbon layer (i.e., a first sintering process). The thickness of the first water repellent carbon layer is approximately 30 μm.

Likewise, the carbon black paste is applied to the other side of the water repellent treated carbon cloth (i.e., a second application process), the PTFE is sintered, and a second water repellent carbon layer is formed (i.e., a second sintering process).

A platinum catalyst paste is formed by mixing the platinum support carbon catalyst (Johnson Matthey Japan Inc.: HiSPEC4000; hereinafter refereed as Pt/C) with 40 wt % of platinum support density, the ion exchange resin solution (Asahi Kasei Corporation: Aciplex SS-1080), the water, and the isopropyl alcohol (i.e., dispersion agent) by the weight ratio of 12:180:23:23. The platinum catalyst paste is applied to the second water repellent carbon layer by the doctor blade method and dried for one hour under the temperature of 60° C. to form the catalyst layer (catalyst support process). The thickness of the catalyst layer is approximately 30 μm. The electrode formed in the foregoing manner is used as the oxidant electrode.

Figure 1:
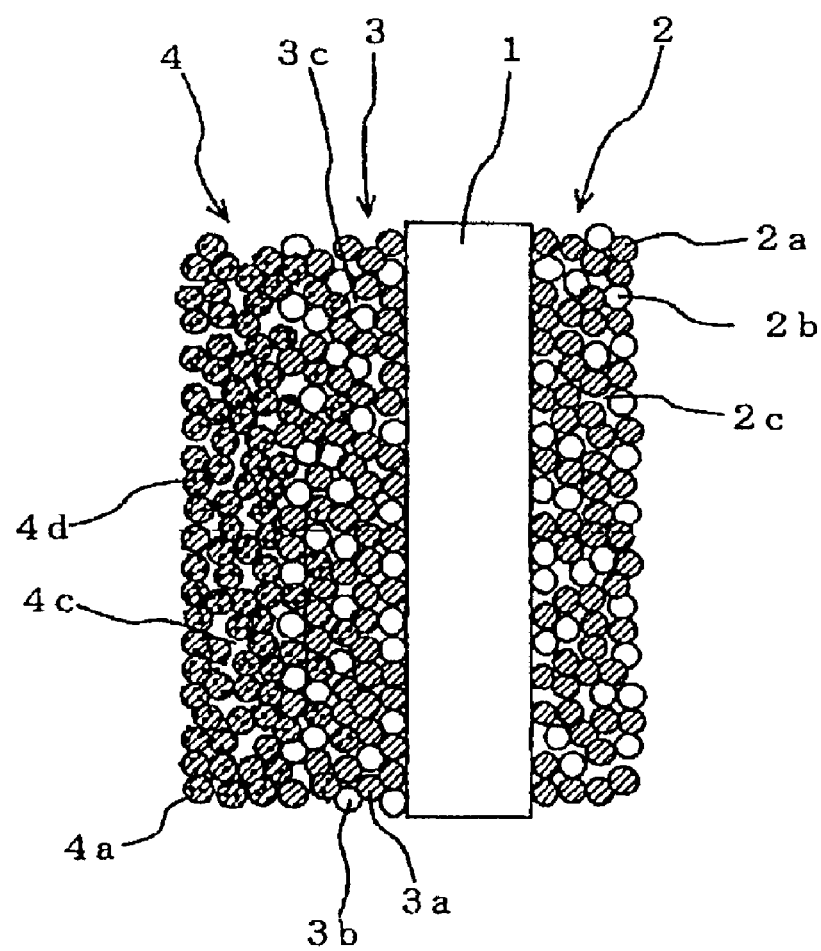
FIG. 1 is a cross-sectional view showing a construction of an electrode of a first embodiment of the present invention.

FIG. 1 shows a cross-sectional view for explaining the construction of the electrode of the first embodiment. Although the thickness of the respective component is very thin, the drawing of the components is exaggerated for making the explanation easy.

As shown in FIG. 1, the electrode of the first embodiment includes a carbon cloth 1, a first water repellent carbon layer 2, a second water repellent carbon layer 3, and a catalyst layer 4. The carbon cloth 1 is approximately plane plate form under the condition formed as the electrode. The first water repellent carbon layer 2 is provided on one side (i.e., right side of FIG. 1) of the carbon cloth 1. The second water repellent carbon layer 3 and the catalyst layer 4 are provided on the other side (i.e., left side of FIG. 1) of the carbon cloth. The catalyst layer 4 is provided on the second water repellent carbon layer 3 away from the carbon cloth 1.

The first water repellent carbon layer 2 is constructed with carbon particles 2a and PTFE particles 2b. The PTFE particles 2b also serves as the binding material by being sintered. The carbon particles 2a and the PTFE particles 2b are not tightly arranged to allow gas flow. A number of spaces 2c are formed in the first water repellent carbon layer 2 and the spaces 2c are connected to one another for passing the gas theretrough. The second water repellent carbon layer 3 is also constructed with carbon particles 3a and PTFE particles 3b and includes spaces 3c for passing the gas theretrough.

The catalyst layer 4 is constructed with carbon particles 4a and catalysts 4d. The catalysts 4d are supported by the carbon particles 4a. The carbon particles 4a are not tightly arranged each other. A number of spaces 4c are formed in the catalyst layer 4 and the spaces 4c are connected one another for passing the gas therethrough.

Although a border is shown between each component to make the explanation simple in FIG. 1, in practice, the border layers of the first water repellent carbon layer 2 and the second water repellent carbon layer 3 are infiltrated into the carbon cloth 1. A border layer of the catalyst layer 4 is infiltrated into the second water repellent carbon layer 3, that is, the carbon particles 4a supporting the catalysts 4d are infiltrated into the second water repellent carbon layer 3.

The fuel electrode is formed likewise the oxidant electrode except using the platinum (i.e., support concentration 30 wt %)—ruthenium (i.e., support concentration 22.5 wt %) alloy support carbon catalyst (TANAKA KIKINZOKU KOGYO K.K.: TEC61E54, hereinafter referred as Pt—Ru/C) as catalyst in the catalyst support process. The thickness of the catalyst layer is 20 μm.

Solid polymer electrolyte membrane (JAPAN GORE-TEX: Gore-Select; thickness 30 μm) is used as an electrolyte. A membranes-electrode joint body is formed by positioning the respective catalyst layers on the solid polymer electrolyte membrane side to sandwich the solid polymer electrolyte membrane by the oxidant electrode and the fuel electrode to joint them by the hot press by 0.3 Mpa under the temperature of 120° C. The size of the solid polymer electrolyte membrane in this case is 200 mm by 200 mm. The size of the oxidant electrode and the fuel electrode is 140 mm by 174 mm. The size of the solid polymer electrolyte membrane and the oxidant electrode and the fuel electrode are the same in the following second, third embodiments and in a comparative example.

According to a second embodiment, 300 g of carbon black (Vulcan XC-72R, average particle diameter 40 nm) is mixed with the 1000 g water added with 90 g dispersion agent. After sufficiently mixing, 250 g of PTFE dispersion liquid concentrate is added and further mixed to; form the carbon ink.

After impregnating the carbon cloth (Nippon Carbon Ltd.: GF-20-P7) with the carbon ink, the carbon cloth is removed from the carbon ink. The carbon cloth is dried for one hour in the room temperature. Then the excessive water of the carbon cloth is evaporated in the furnace kept at the temperature of 80° C., the carbon cloth is maintained under the sinter temperature of 390° C. for 60 minutes for sintering the PTFE.

Thus, the first water repellent carbon layer and the second water repellent carbon layer are simultaneously formed on the both sides of the carbon cloth. That is, according to the second embodiment, the first application process and the second application process are performed simultaneously and the first sintering process and the second sintering process are performed simultaneously. The thickness of the first water repellent carbon layer and the second water repellent carbon layer is 30 μm.

Next, likewise the first embodiment, respective catalysts are formed on the second water repellent carbon layer to make the oxidant electrode and the fuel electrode (i.e., catalyst support process). Using the oxidant electrode and the fuel electrode, membranes-electrode joint body is formed likewise in the first embodiment.

According to a third embodiment, the carbon ink which is used in the second embodiment is used. Using a roll coater method, the first water repellent carbon layer and the second water repellent carbon layer are formed simultaneously on the both sides of the carbon cloth (Nippon Carbon Ltd.: GF-20-P7). The thickness of the first water repellent carbon layer is 30 μm and the thickness of the second water repellent carbon layer is 30 μm.

Next, likewise in the first embodiment, respective catalyst layers are formed on the second water repellent carbon layer to make the oxidant electrode and the fuel electrode (i.e., catalyst support process). Using the oxidant electrode and the fuel electrode, membranes-electrode joint body is formed likewise in the first embodiment.

According to a comparative example, the oxidant electrode and the fuel electrode are formed in the same manner with the first embodiment except excluding the first water repellent carbon layer, that is, excluding the first application process and the first sintering process. The membranes-electrode joint body is also formed.

A single cell is made by sandwiching the membrane-electrode joint body formed in the first though the third embodiments and in the comparative example by a pair of separators having gas passages for supplying the fuel gas respectively. The evaluation is performed under the following condition.

Figure 5:
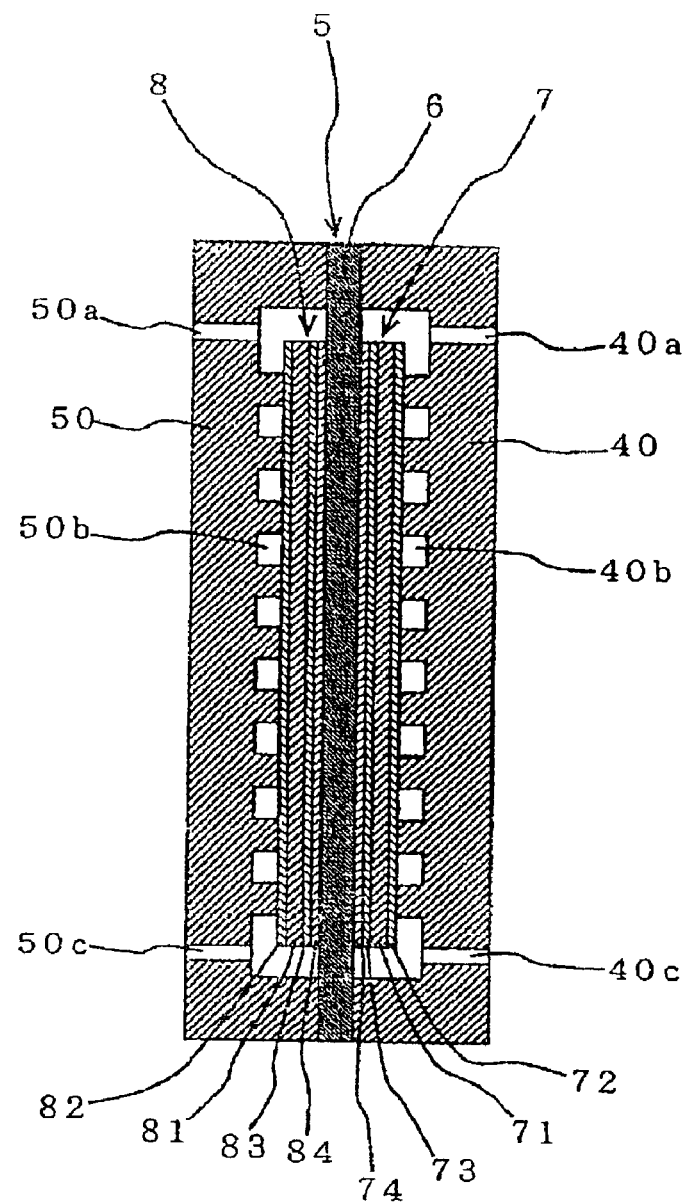
FIG. 5 is a cross-sectional view showing a construction of a single cell according to the embodiments of the present invention.

As shown in FIG. 5, the single cell includes a membranes-electrode joint body 5, a solid polymer electrolyte membrane 6, an oxidant electrode 7, and a fuel electrode 8. The solid polymers electrolyte 6 is sandwiched by the oxidant electrode 7 and the fuel electrode 8 to be jointed. In the oxidant electrode 7, a first water repellent carbon layer 72 is provided on one side of a carbon cloth 71, and a second water repellent carbon layer 73 and a catalyst layer 74 are provided on the other side of the carbon cloth 71. The catalyst layer 74 is provided on the second water repellent carbon layer 73, closer to the solid polymer electrolyte membrane 6. In the fuel electrode 8, a first water repellent carbon layer 82 is provided on one side of a carbon cloth 81. A second water repellent carbon layer 83 and a catalyst layer 84 are provided on the other side of the carbon cloth 81. The catalyst layer 84 is provided on the second water-repellent carbon layer 83, closer to the solid polymer electrolyte membrane 6. Thus, the oxidant electrode 7 and the fuel electrode 8 are jointed to the solid polymer electrolyte membrane 6 so that both catalysts 74, 84 are positioned on the solid polymer electrolyte membrane 6 side.

The single cell further includes a separator 40. The separator 40 is provided with an oxidant gas communication groove 40b for supplying the oxidant gas to the oxidant electrode 7, an oxidant gas supply port 40a, and an oxidant gas outlet port 40c. The oxidant gas supplied from the oxidant gas supply port 40a is exhausted from the oxidant gas outlet port 40c via the oxidant gas communication groove 40b. The single cell also includes a separator 50. The separator 50 is provided with an oxidant gas communication groove 50b for supplying the fuel gas to the fuel electrode 8, a fuel gas supply port 50a, and a fuel gas outlet port 50c. The fuel gas supplied from the fuel gas supply port 50a is exhausted from the fuel gas outlet port 50c via the fuel gas communication groove 50b.

By connecting a plurality of the foregoing single cells in series, a fuel cell stack is formed. Because the plural single cells shown in FIG. 5 are connected in series, the construction of the oxidant gas supply port, the oxidant gas outlet port, the fuel gas supply port, and the fuel gas outlet port is different from the view shown in FIG. 5 when formed into the fuel cell stack. The continuous power generation experiment is performed under the condition that the stack temperature is at 75° C., the air (i.e., oxygen capacity factor 40%) is supplied to the oxidant electrode under the normal pressure, the natural gas reforming pseudo gas (i.e., hydrogen concentration 76%; hydrogen capacity factor 85%) including 10 ppm of carbon monoxide is supplied to the fuel electrode under the normal pressure, and the electric current density is 0.2 A/cm². The measurement of the continuous power generation experiment is performed by measuring the electric voltage between terminals from separators of each cell.

Figure 2:
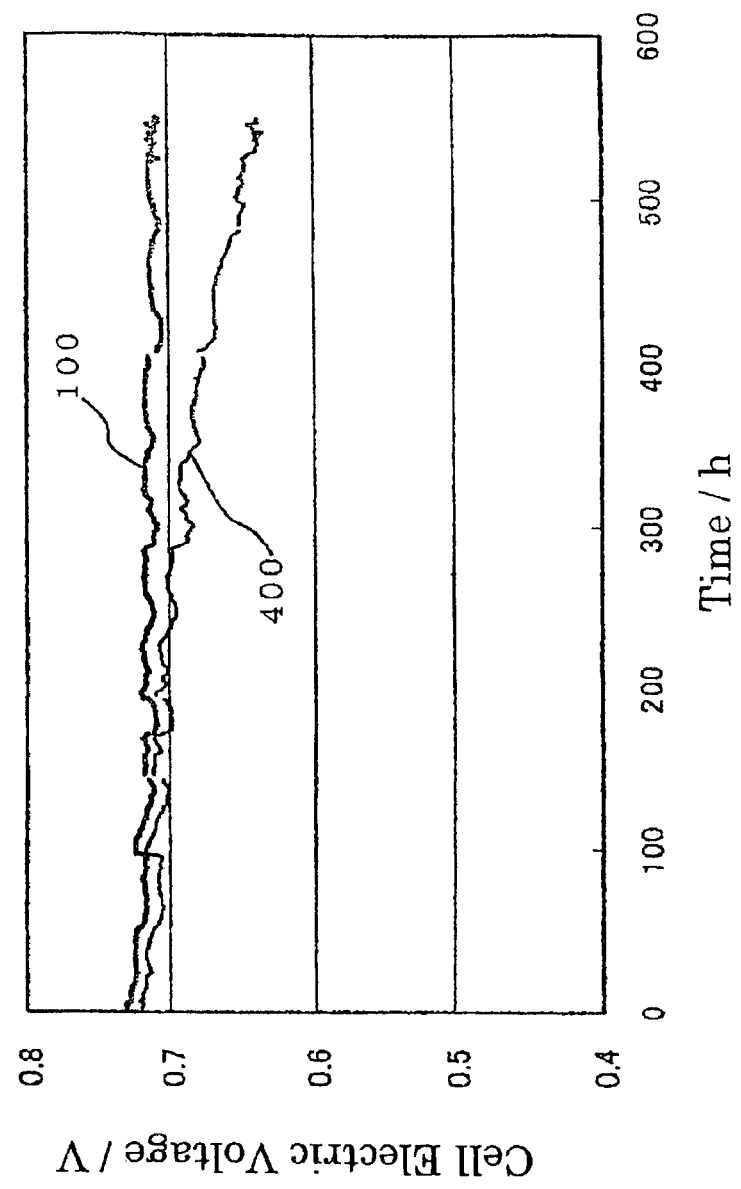
FIG. 2 is a graph showing a continuous power generation test result of the first embodiment and a comparative example.
Figure 3:
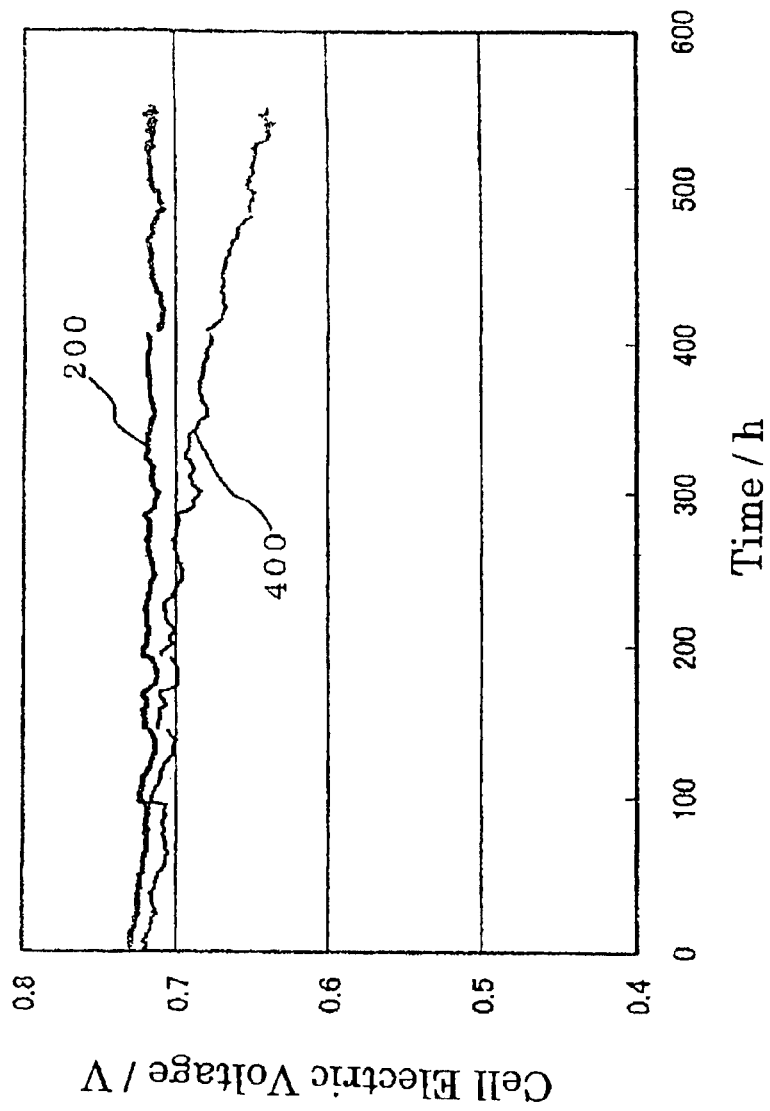
FIG. 3 is a graph showing a continuous power generation test result of a second embodiment and the comparative example.
Figure 4:
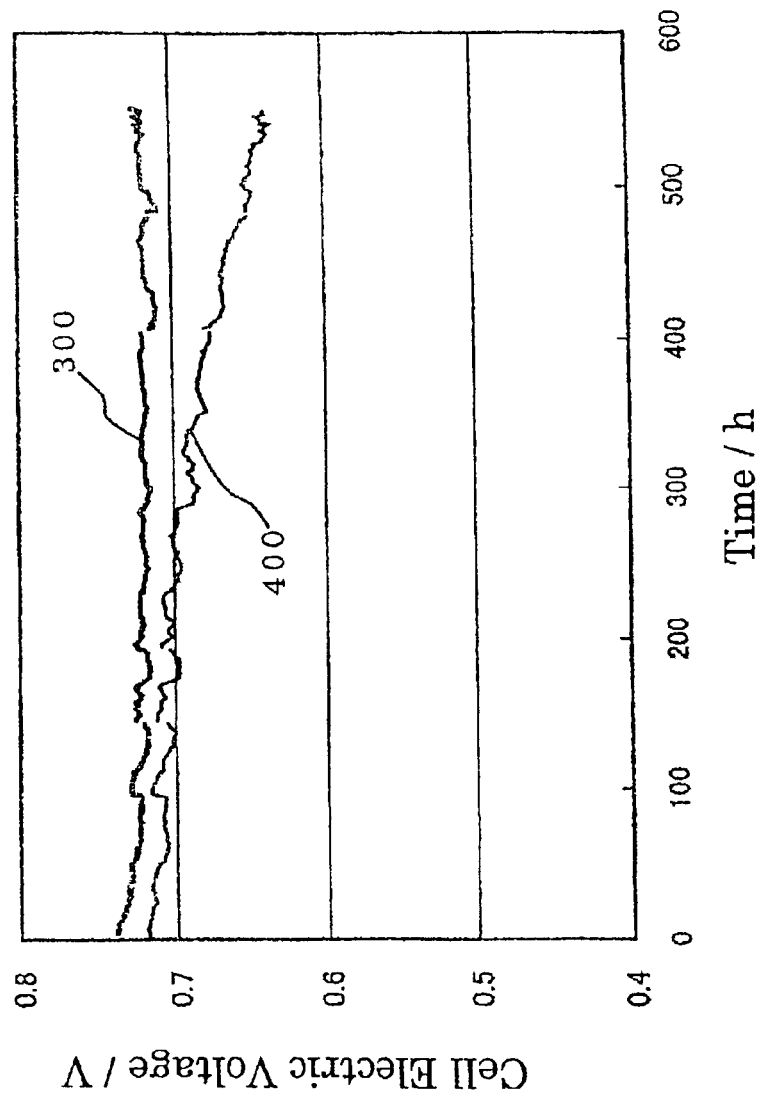
FIG. 4 is a graph showing a continuous power generation test result of a third embodiment and the comparative example.

The result of the evaluation will be shown as follows. The continuous power generation test up to approximately 500 hours is shown in FIGS. 2–4. FIG. 2 shows the result of the continuous power generation test of the first embodiment and the comparative example. FIG. 3 shows the result of the continuous power generation test of the second embodiment and the comparative example. FIG. 4 shows the result of the continuous power generation test of the third embodiment and the comparative example. A time-cell electric voltage curve according to the first embodiment is refereed as 100. A time-cell electric voltage curve according to the second embodiment is refereed as 200. A time-cell electric voltage curve according to the third embodiment is refereed as 300. A time-cell electric voltage curve according to the comparative example is refereed as 400.

Regarding the comparative example, the output electric voltage is declined as the time elapses. Particularly, a sudden decline of the output electric voltage is observed after elapsing 300 hours. On the other hand, the initial output electric voltage of the first through third embodiments is higher than that of the comparative example. In addition, according to the first through third embodiments, the output electric voltage is stabled after the approximately 50 hours of running-in time and the decline of the output voltage shown in the comparative example is not observed.

The continuous power generation test is resulted in the foregoing manner because the contact resistance between the electrode and the separator is reduced and the flooding phenomenon at the contact portion between the electrode and the separator is prevented due to the formation of the water repellent conductive layer by applying the electrically conductive water repellent material including the electrically conductive particles and the water repellent particles of the gas diffusion substrate on the side contacting the separator.

That is, because the conductive particles of the surface of the gas diffusion substrate contacting the separator can be positioned with higher density compared to the conductive material in the gas diffusion substrate, the electric contact dimension with the separator is increased, and thus the contact resistance with the separator can be reduced. In addition, because the water repellent particles can be positioned with higher density on the surface of the gas diffusion substrate contacting the separator compared to in the gas diffusion substrate, the water generated at the contact portion between the electrode and the separator is repelled and is moved to the gas passage of the separator to be exhaust as the water vapor, the flooding phenomenon can be prevented even if the separator does not includes the water repellency.

In the water repellent conductive layer, the appropriate water repellency and the conductivity can be provided by selecting the kinds and the volume of the electrically conductive particles and the water repellent particles. According to the first and the third embodiments, appropriate layer constructions can be achieved respectively because the different composition and the thickness can be selected for the first water-repellent carbon layer and for the second water repellent carbon layer. According to the third embodiment, the electrode with excellent power generation can be produced with low cost because the first water repellent carbon layer and the second water repellent carbon layer can be manufactured simultaneously.

On the other hand, according to the second embodiment, the first water repellent carbon layer and the second water repellent carbon layer are formed with the same composition and the same thickness. Because the first water repellent carbon layer and the second water repellent carbon layer can be produced simultaneously by simple device performing impregnation and the removing, according to the second embodiment, the electrode with excellent power generation can be manufactured with low cost. In addition, because the composition and the thickness of the water repellent carbon layer can be controlled by the composition and the viscosity of the carbon ink, there is an advantage that the quality control becomes easy.

Although the first water repellent carbon layer is provided on the fuel electrode in the first through third embodiments, the electrode without the first water repellent carbon layer can be used for the fuel electrode. This is because the flooding phenomenon is hard to be caused on the fuel electrode side because the water is not generated on this side and the only water provided is the water vapor included in the fuel gas on the fuel electrode side. On the other hand, the flooding phenomenon is more crucial on the oxidant electrode side because the water moved from the fuel electrode accompanied with the proton and the water generated following the reaction of formula (2) exist besides the water vapor included in the oxidant gas. However, by providing the first water repellent carbon layer on the fuel electrode likewise the first through third embodiments, the contact resistance between the electrode and the separator can be reduced and the flooding phenomenon can be completely prevented. As being discussed above, it is effective to select the composition of the first water repellent carbon layer appropriate for the oxidant electrode and for the fuel electrode respectively.

Figure 6:
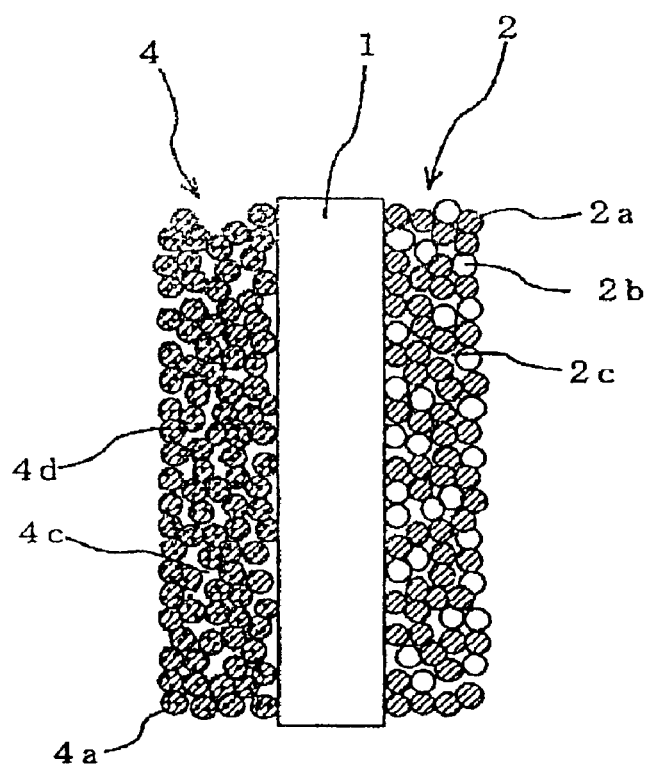
FIG. 6 is a cross-sectional view showing a construction of another electrode of the present invention.

Although the second water repellent carbon layer is provided in the first through third embodiments, the catalyst layer may be directly formed on the gas diffusion substrate without providing the second water repellent carbon layer as shown in FIG. 6. However, because the catalyst can be three-dimensionally dispersed by the infiltration of the carbon particles supporting the catalyst into the second water repellent carbon layer by providing the second water repellent carbon layer, the catalyst layer with excellent water repellency can be formed to improve the power generation characteristics.

Although the catalyst support is performed by applying the catalyst support carbon in the embodiments, the catalyst support may be performed by forming the carbon layer on the other side of the gas diffusion substrate for supporting the catalyst on the carbon layer. The catalyst may be supported after impregnating the carbon with the gas diffusion substrate for supporting the catalyst on the other side of the gas diffusion substrate.

Although the carbon cloth is used as the gas diffusion substrate in the embodiments, porous materials with electric conductivity such as carbon paper and carbon sheet may be used. Although the carbon black is used as the electrically conductive particles in the embodiments, particles having the electric conductivity and the corrosion resistance may be used. Although the PTFE particles are used as the water repellent particles in the embodiments, particles having the water repellency and the corrosion resistance may be used.

Thus, according to the embodiments of the present invention, the fuel cell is provided with the joint body sandwiching the electrolyte by the oxidant electrode and the fuel electrode to be jointed and the manufacturing method of the fuel cell electrode includes the first application process for applying the electrically conductive water repellent material including the electrically conductive particles and the water repellent particles on one side of the gas diffusion substrate having the gas permeability, the first sintering process for sintering the applied electrically conductive water repellent material, and the catalyst support process for supporting the catalyst on the other side of the gas diffusion substrate. Because in the fuel cell according to the embodiments of the preset invention at least the oxidant electrode out of the oxidant electrode and the fuel electrode corresponds to the foregoing fuel cell electrode, the contact resistance with the separator is reduced, the manufacturing method of the fuel cell electrode in which the flooding phenomenon is hard to be caused at the contact portion with the separator and the fuel cell with excellent power generation and high reliability can be provided.

According to the embodiments of the present invention, the electrically conductive ware repellent material including the electrically conductive particles and the water repellent particles is applied to one side of the gas diffusion substrate contacting the separator. Thus, the contact resistance between the electrode and the separator can be reduced and the flooding at the contact portion between the electrode and the separator can be prevented.

According to the embodiments of the present invention, the electrically conductive material on which the catalyst is supported can be three-dimensionally dispersed on the electrically conductive water repellent material applied on the surface of the gas diffusion substrate. Thus, the catalyst layer has high water repellency to improve the electric generation characteristics.

According to the embodiments of the present invention, the electrically conductive water repellent material can be simultaneously applied on the both sides of the gas diffusion substrate and can be sintered simultaneously. Thus, the operation time can be shortened to reduce the manufacturing cost.

According to the embodiments of the present invention, the fuel cell electrode can be manufactured easily using the simple device by impregnating the gas diffusion substrate with a dispersion liquid including the electrically conductive water repellent material and by removing the impregnated gas diffusion substrate from the dispersion liquid. Thus, the manufacturing cost can be further reduced. In addition, because the composition and the thickness of the water repellent carbon layer can be controlled by the composition of the dispersion liquid and the viscosity, the quality control becomes easy.

According to the embodiments of the present invention, the electrically conductive water repellent material with different compositions can be applied simultaneously on the both sides of the gas diffusion substrate using the roll coater method. Thus, the manufacturing cost of the fuel cell electrode can be reduced and the optimal electrically conductive water repellent material for both sides can be selected.

According to the embodiments of the present invention, the fuel cell electrode which can reduce the contact resistance between the electrode and the separator and can prevent the flooding at the contact portion between the electrode and the separator is used at least as the oxidant electrode on which the flooding is apt to be caused. Thus, the fuel cell which has high electric generation performance and has high reliability can be achieved.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A manufacturing method of a fuel cell, which comprises:
   preparing a fuel cell electrode for the fuel cell;
   wherein said preparing comprises
   a first application process, which compises:
   applying an electrically conductive water repellent material comprising electrically conductive particles and water repellent particles on one side of a gas diffusion substrate having gas permeability and
   a first sintering process, which comprises
   sintering the applied electrically conductive water repellent material and thereby forming a layer comprising the electrically conductive particles and the water repellent particles;
   wherein the layer comprises of at least about 33 wt % water repellent particles;

a catalyst support process which comprises supporting a catalyst on the other side of the gas diffusion substrate; and contacting the layer to a separator of the fuel cell.

2. A manufacturing method of a fuel cell according to claim 1, wherein the catalyst support process comprises the steps of a second application process, which comprises applying an electrically conductive water repellent material comprising electrically conductive particles and water repellent particles on the other side of the gas diffusion substrate and a second sintering process, which comprises sintering the applied electrically conductive water repellent material; and a third application process, which comprises applying an electrically conductive material supporting the catalyst on the applied electrically conductive water repellent material.

3. A manufacturing method of a fuel cell according to claim 2, wherein the first application process and the second application process are performed simultaneously and the first sintering process and the second sintering process are performed simultaneously.

4. A manufacturing method of a fuel cell according to claim 3, wherein the first application process and the second application process are performed simultaneously by impregnating the gas diffusion substrate with a dispersion liquid which comprises the electrically conductive water repellent material and by removing the impregnated gas diffusion substrate from the dispersion liquid.

5. A manufacturing method of a fuel cell according to claim 3, wherein the first application process and the second application process are simultaneously performed by a roll coater method.

6. A fuel cell obtained by a process according to any one of claims 1–5, which comprises:

a joint body obtained by sandwiching an oxidant electrode and a fuel electrode to be jointed;

wherein at least one of the oxidant electrode and the fuel electrode is the fuel cell electrode.

7. A manufacturing method of a fuel cell, which comprises:

preparing a fuel cell electrode for the fuel cell;

wherein said preparing comprises a first application process, which comprises applying an electrically conductive water repellent material comprising electrically conductive particles and water repellent particles on one side of a gas diffusion substrate having gas permeability and a first sintering process, which comprises sintering the applied electrically conductive water repellent material and thereby forming a layer comprising the electrically conductive particles and the water repellent particles;

wherein the layer is substantially permeable to water vapor;

a catalyst support process which comprises supporting a catalyst on the other side of the gas diffusion substrate; and contacting the layer to a separator of the fuel cell.

8. A manufacturing method of a fuel cell according to claim 7, wherein the catalyst support process comprises the steps of a second application process, which comprises applying an electrically conductive water repellent material comprising electrically conductive particles and water repellent particles on the other side of the gas diffusion substrate and a second sintering process which comprises sintering the applied electrically conductive water repellent material; and third application process for applying an electrically conductive material supporting the catalyst on the applied electrically conductive water repellent material.

9. A manufacturing method of a fuel cell according to claim 8, wherein the first application process and the second application process are performed simultaneously and the first sintering process and the second sintering process are performed simultaneously.

10. A manufacturing method of a fuel cell according to claim 9, wherein the first application process and the second application process are performed simultaneously by impregnating the gas diffusion substrate with a dispersion liquid which comprises the electrically conductive water repellent material and by removing the impregnated gas diffusion substrate from the dispersion liquid.

11. A manufacturing method of a fuel cell according to claim 9, wherein the first application process and the second application process are simultaneously performed by a roll coater method.

12. A fuel cell obtained by a process according to any one of claims 7–11, which comprises:

a joint body obtained by sandwiching an oxidant electrode and a fuel electrode to be jointed;

wherein at least one of the oxidant electrode and the fuel electrode is the fuel cell electrode.

* * * * *